(12) United States Patent
Uselton et al.

(10) Patent No.: US 12,436,132 B1
(45) Date of Patent: Oct. 7, 2025

(54) WELD SEAM FINDING AND MARKING SYSTEMS AND METHODS FOR TUBULAR GOODS

(71) Applicant: PITCO, LLC, Houston, TX (US)

(72) Inventors: Danny Uselton, Spring, TX (US); John Zeigler, The Woodlands, TX (US)

(73) Assignee: PITCO, LLC, Houston, TX (US)

( * ) Notice: Subject to any disclaimer, the term of this patent is extended or adjusted under 35 U.S.C. 154(b) by 364 days.

(21) Appl. No.: 18/153,456

(22) Filed: Jan. 12, 2023

(51) Int. Cl.
*G01N 27/9093* (2021.01)
*G01N 27/9013* (2021.01)
*G01N 27/904* (2021.01)
*G01N 33/207* (2019.01)

(52) U.S. Cl.
CPC ....... *G01N 27/9093* (2013.01); *G01N 27/902* (2013.01); *G01N 27/904* (2013.01); *G01N 33/207* (2019.01)

(58) Field of Classification Search
None
See application file for complete search history.

(56) References Cited

U.S. PATENT DOCUMENTS

| | | | |
|---|---|---|---|
| 3,710,236 A | 1/1973 | Halsey et al. | |
| 3,762,624 A | 10/1973 | Sprung | |
| 4,503,393 A | 3/1985 | Moyer et al. | |
| 4,577,796 A | 3/1986 | Powers | |
| 4,644,272 A | 2/1987 | Janos | |
| 5,142,230 A | 8/1992 | Nottingham | |
| 5,157,977 A | 10/1992 | Grubbs | |
| 5,464,957 A | 11/1995 | Kidwell | |
| 5,656,786 A | 8/1997 | Curtis, Jr. et al. | |
| 7,038,445 B2 | 5/2006 | Walters et al. | |
| 7,397,238 B2 | 7/2008 | Walters et al. | |
| 8,003,914 B2 | 8/2011 | Masahiro et al. | |
| 2004/0237653 A1* | 12/2004 | Graff .................... | B23K 31/12 73/622 |
| 2005/0217394 A1* | 10/2005 | Langley ................ | G01B 5/066 73/865.8 |
| 2009/0132181 A1* | 5/2009 | Girndt .................. | G01N 27/902 702/39 |

FOREIGN PATENT DOCUMENTS

| | | | |
|---|---|---|---|
| EP | 0057068 | A1 | 8/1982 |
| EP | 0322758 | A1 | 7/1989 |
| EP | 0613751 | A1 | 9/1994 |

(Continued)

*Primary Examiner* — Nasima Monsur
(74) *Attorney, Agent, or Firm* — Jeffrey L. Wendt; The Wendt Firm, P.C.

(57) ABSTRACT

Longitudinally welded tubular member inspection and marking systems and methods. One system includes a longitudinal weld seam detection assembly and a marking assembly configured to be positioned about a longitudinally welded tubular member in an inspection position. The detection assembly includes a magnetic flux generator including a flux return and one or more sensors supported by the flux return and sensor supports. The marking assembly includes one or more marking heads. A computer is programmed to accept longitudinal weld seam detection signals transmitted from the one or more sensors and convert them into positioning information for the marking assembly to mark the longitudinal weld seam.

15 Claims, 11 Drawing Sheets

(56) References Cited

FOREIGN PATENT DOCUMENTS

| | | |
|---|---|---|
| WO | WO2001001123 A1 | 1/2001 |
| WO | WO2007043707 A1 | 8/2011 |
| WO | WO2012129994 A1 | 10/2012 |
| WO | WO2019057836 A1 | 3/2019 |
| WO | WO2020175041 A1 | 9/2020 |

* cited by examiner

WELD SEAM FINDING AND MARKING SYSTEMS AND METHODS FOR TUBULAR GOODS

BACKGROUND INFORMATION

Technical Field

The present disclosure relates to systems and methods useful for inspecting and marking tubular goods, particularly longitudinally welded hollow tubular goods (sometimes referred to in the oil & gas industry as "oil country tubular goods", and herein sometimes as simply "OCTG").

Background Art

Longitudinally welded tubulars are used for many purposes, including the oil and gas industry, automotive industry, and others. Often times it is important to the manufacturer of welded tubulars and downstream users to know where the weld seam is in welded tubulars. The weld seam is sometimes also referred to as the weld line. It is known for example, from published international patent application WO01001123A1 to use eddy current of suitable frequency for this purpose. Eddy current is sounded into a longitudinally welded tubular by means of a probe and the received signal is converted into a display which results either in a low signal (base material) or in a high signal (weld). U.S. Pat. No. 4,644,272 also discloses a method of using eddy current and mentions use of a marker with delay circuitry for actuating the marker to mark the tubular after a flaw is detected. No mention is made of tracking and marking the weld seam, however. Other methods may make use of magnetically sensitive transducers to detect weld seams, such as disclosed U.S. Pat. No. 4,503,393, comprising an apparatus for applying a magnetic force to produce a generally axial field through the tubular and having various sensing elements for sensing radial magnetic fields and generating signals corresponding to those magnetic fields. Weld seams in the tubular cause discontinuities in the magnetic flux lines which are generated in the tubular. These discontinuities in the magnetic field are detected by the sensing elements. U.S. Pat. No. 3,710,236 discloses an apparatus for detecting longitudinal flaws in a magnetically energized body using a pair of overlaying, overlapping Hall devices. Other patented OCTG inspection methods employing Hall units include U.S. Pat. Nos. 7,038,445 and 7,397,238. U.S. Pat. No. 5,157,977 discloses an apparatus for eddy current inspection of inner and outer surfaces, and internal and external threads of end areas of tubulars. The apparatus is a machine for feeding, indexing, testing, and storing tubular goods. U.S. Pat. No. 5,656,786 discloses oilfield tubular inspection apparatus and methods, and discusses the prove-up process, marking and seams. The disclosure focuses on getting the initial inspection data to the prove up operator so she can work more efficiently.

One goal of OCTG producers is high tonnage production per day or other time period, and any process or sub-process that slows down the manufacturing of OCTG or other tubulars is disadvantageous economically. In short, the more tons of pipe out the door the better. In the case of longitudinally welded tubulars, producers of such tubulars do not always achieve a perfectly straight line longitudinal weld, but the longitudinal weld will have a small amount of twist, which is normal, but when accumulated over the length of a tubular, can cause uncertainty in the location of the longitudinal weld seam. Inspectors and end users of longitudinally welded tubulars are desirous of being able to know exactly where the longitudinal weld seam is, for the entire length of the tubular, or a substantial portion thereof. For those inspecting the quality of longitudinal weld seams using ultrasonic transducers, they need to know the location of the longitudinal weld seam at the end of the tubular in order to properly position the ultrasonic transducer(s), and as the longitudinal weld seam changes position (either by the tubular rotating slightly, or the weld seam itself "twisting" from its initial position in the tubular, or both), the ultrasonic sensor(s) need to change position as well. Ultrasonic transducers have a small window of position over the longitudinal weld seam where they can inspect the weld seam.

The simple fact that the weld seam may change position by one or both of these effects (tubular rotation and/or weld seam changing position in the tubular) contributes to less production for those inspecting longitudinally welded tubulars, and more time for end users to gain knowledge of the exact position of the welded seam, which can be detrimental to good manufacturing practice. A need exists for longitudinally welded OCTG weld seam finding and marking systems and methods that assure good, accurate initial position finding of longitudinal weld seams and are able to compensate for one or both of the weld seam changes in position discussed above, but are also able to mark the longitudinal weld seam of longitudinally weld tubulars in order to visually determine where the longitudinal weld seam is along the length of the longitudinally weld tubulars (either by a human or using machine vision, camera vision, and the like) in order to properly inspect the longitudinal weld lines of longitudinally welded tubulars by downstream ultrasonic inspection. The systems and methods of the present disclosure are directed to these needs.

SUMMARY

In accordance with the present disclosure systems for finding and marking the longitudinal weld in longitudinally welded OCTG and other tubulars are presented, and methods of using same, are described which reduce or overcome many of the faults of previously known systems and methods.

A first aspect of the disclosure is a longitudinal weld seam finding and marking system for longitudinally welded tubular members (P) comprising:

(a) a longitudinal weld seam detection assembly (LWSDA, 2) and a marking assembly (30) configured to be positioned about a longitudinally welded tubular member (LWTM, P) in an inspection position, the LWSDA (2) comprising a head rotatable about the LWTM (referred to herein as a "rotating head", (5)), the rotating head (5) supporting a magnetic flux generator including a flux return (4), and supporting one or more sensors (20) supported by the flux return (4) and sensor supports (18), the marking assembly (30) comprising one or more marking heads (32);

(b) the LWSDA (2) and marking assembly (30) each having an inlet opening and an outlet opening for passing the LWTM (P) therethrough, the one or more sensors (20) comprising one or more magnetic or eddy current detectors adapted to be spaced a distance (D) from an outer surface (22) of the LWTM (P) (optionally using one or more substantially frictionless members) during an inspection;

(c) a computer programmed to
  (i) accept longitudinal weld seam detection signals transmitted from the one or more sensors (20) and convert the longitudinal weld seam detection signals into positioning information for positioning (rotational movement of) the marking assembly to mark the longitudinal weld seam (S);
  (ii) transmit a first signal to rotate the marking assembly to a position where one of the marking heads can mark the longitudinal weld seam (S);
  (iii) transmit a second signal to initiate the marking assembly;
(d) the marking assembly (30) configured to mark the LWTM (P) on the outer surface (22) with at least one mark (M) using the one or more marking heads (32) to indicate a location of the longitudinal weld seam (S) of the LWTM (P) in accordance with the longitudinal weld seam detection signals.

In certain embodiments the marking assembly is non-adjustable for diameter of the LWTM (P). In other embodiments the marking assembly comprises an adjustable iris plate rotor for marking LWTM (P) of different diameters. In certain embodiments, even if the LWTM (P) is marked only periodically along its entire length, the position of the longitudinal weld seam is continuously tracked by the one or more sensors (20) comprising one or more magnetic or eddy current detectors, and that longitudinal weld position data for the entire length of the LWTM (P) may be stored in the computer.

In certain embodiments the flux return bridges a first magnet core and a second magnet core, and includes a first electrically conductive coil wrapped around the first magnet core and a second electrically conductive coil wrapped around the second magnet core, with a first DC power source for the first electrically conductive coil, and a second DC power source for the second electrically conductive coil. In certain embodiments the first and second DC power sources may be configured to accept respective signals from a cabinet with a human-machine interface (HMI) and computer controls, or a portable laptop computer or other portable computer, the HMI or the laptop or other portable computer having a keyboard and a CRT or other human-readable, interactive screen, such as a touch screen. In certain embodiments a single DC power source may be used, connected in series or parallel to the first and second electrically conductive coils. In certain other embodiments, rather than electromagnets, permanent magnets may be employed.

In certain embodiments the cabinet with HMI and computer controls or a laptop or other portable computer may be configured to send signals to a pneumatic (or electric or hydraulic) actuator and pneumatic instrument tubing to actuate the one or more marking heads.

In certain other embodiments the cabinet with HMI and computer controls or a laptop or other portable computer are configured to send signals to a hydraulic, pneumatic, or electronically operated support stand configured to move the marking assembly vertically up or down as needed depending on the diameter of the LWTM (P) being marked.

Certain embodiments may comprise an ink or other marking fluid supply container fluidly connected by tubing to the one or more marking heads. In certain other embodiments the marking heads may have replaceable ink or paint container cartridges.

Certain embodiments may comprise a geared drive wheel having gear teeth that mate with gear teeth on an outer peripheral surface of the marking assembly, allowing the marking assembly to rotate+/−90 degrees as commanded by the cabinet with HMI and computer controls or a laptop or other portable computer, in response to the sensors in the longitudinal weld seam detection assembly (LWSDA, 2) indicating that the longitudinal weld seam position has changed Another aspect of the disclosure is a marking assembly (260) configured to mark a longitudinal weld seam (S) of longitudinally welded tubular members (LWTM (P)) on an outer surface (22) with one or more marks (M) using one or more marking heads (116) to indicate a location of the longitudinal weld seam (S) of the LWTM (P) in accordance with longitudinal weld seam detection signals, the marking assembly (260) comprising:
  (i) an adjustable iris rotor plate (104) having a central passage (105) and one or more arcuate slots (110);
  (ii) a drive plate (106) also having a central passage substantially coincident with the central passage (105), the drive plate (106) comprising one or more U-shaped support brackets (120) configured to support and guide the adjustable iris rotor plate (104) therein when the adjustable rotor plate (104) is moved to accommodate LWTM (p) of different diameters; and
  (iii) a center stator plate (108) also having a central passage substantially coincident with the central passage (105), the center stator plate comprising one or more marking heads (116) slidably secured thereto by respective rails (138).

In certain embodiments the outer edge of drive plate 106 includes a set of gear teeth, and a drive wheel having a set of mating gear teeth is commanded by the computer to move the marking assembly (260) circumferentially in response to signals from the sensors that are detecting position of the longitudinal weld seam. Other embodiments may include other means of effecting movement of the marking assembly (260), such as worm gears and the like, and the gearing need not be on the outer edge of the drive plate (106). In certain embodiments, the adjustable iris rotor plate (104) may further comprise two or more through holes (112) near a peripheral outer edge (118) of the adjustable iris rotor plate (104), and an adjustment pin (114) that may be moved into and out of the two or more through holes (112), each of the two or more through holes (112) corresponding to respective two or more diameters of LWTM (P) to be marked. In certain embodiments the center stator plate (108) may comprise one or more marking heads (116) slidably secured thereto by respective rails (138) and further comprises rollers positioned in the one or more arcuate slots (110).

Methods for accurately, quickly, and safely finding and marking longitudinal weld seams of longitudinally welded tubular members and other tubulars are further aspects of the disclosure and described herein. Once the longitudinal weld seam is marked, one or more downstream ultrasonic inspection transducers may be moved into position to inspect the longitudinal weld seam, and these finding, marking, and downstream inspection methods are also considered aspects of the present disclosure.

These and other features of the systems and methods of the disclosure will become more apparent upon review of the brief description of the drawings, the detailed description, and the claims that follow. It should be understood that wherever the term "comprising" is used herein, other embodiments where the term "comprising" is substituted with "consisting essentially of" are explicitly disclosed herein. It should be further understood that wherever the term "comprising" is used herein, other embodiments where the term "comprising" is substituted with "consisting of" are explicitly disclosed herein. Moreover, the use of negative limitations is specifically contemplated; for example, certain systems and methods may comprise a number of physical components and features but may be devoid of certain optional hardware and/or other features. For example, some systems may be devoid of eddy current generators.

BRIEF DESCRIPTION OF THE DRAWINGS

The manner in which the objectives of this disclosure and other desirable characteristics can be obtained is explained in the following description and attached drawings in which:

It is to be noted, however, that the appended drawings of FIGS. 1-9 may not be to scale and illustrate only typical system and apparatus embodiments of this disclosure. Furthermore, FIGS. 10 and 11 illustrate only two of many possible methods of this disclosure. Therefore, the drawing figures are not to be considered limiting in scope, for the disclosure may admit to other equally effective embodiments. Identical reference numerals are used throughout the several views for like or similar elements, except where noted.

DETAILED DESCRIPTION

Figure 1:
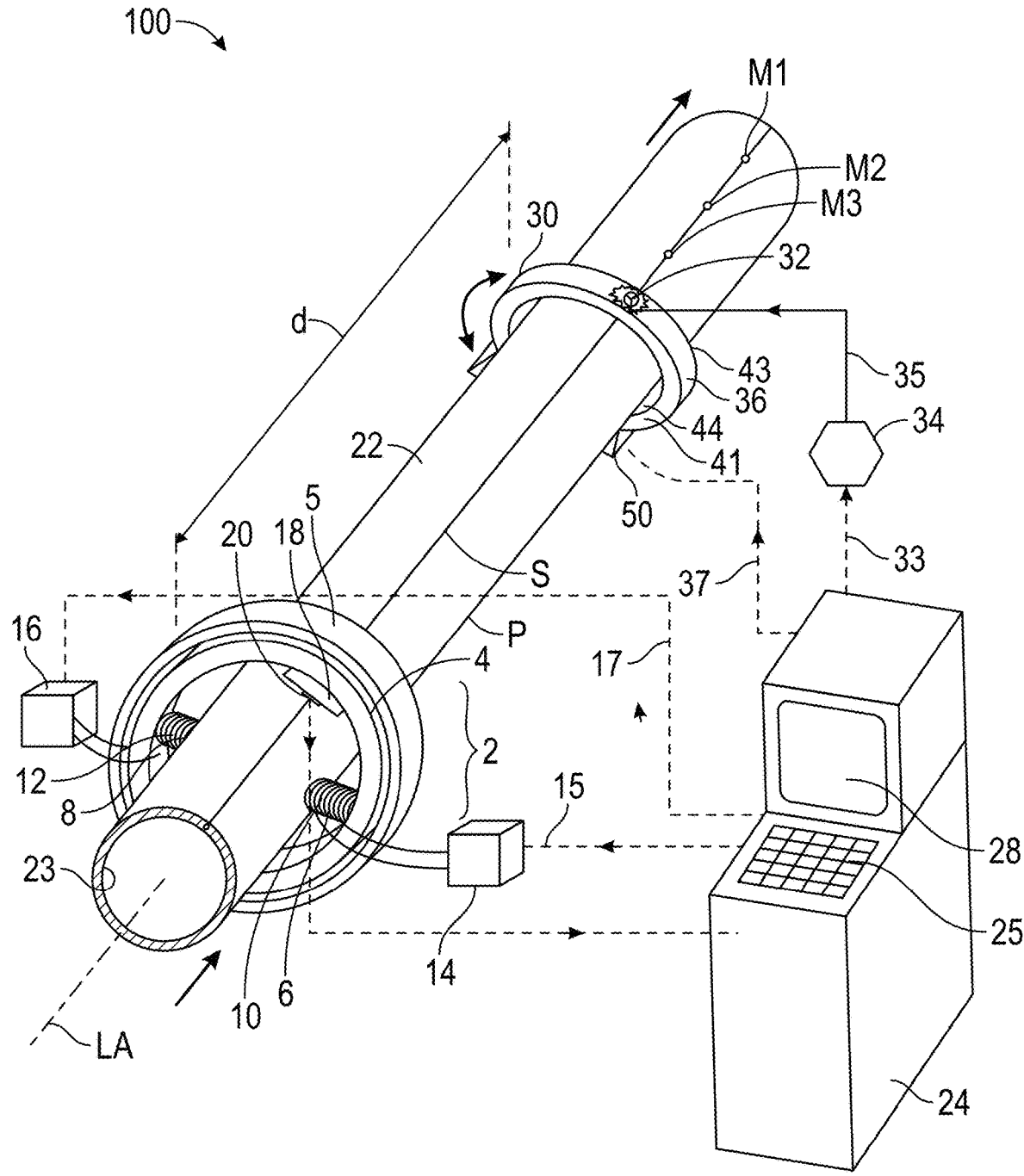
FIG. 1 is a schematic perspective view of one system embodiment of the present disclosure, featuring an operator control cabinet.

In the following description, numerous details are set forth to provide an understanding of the disclosed apparatus, combinations, systems and methods. However, it will be understood by those skilled in the art that the apparatus, combinations, systems and methods disclosed herein may be practiced without these details and that numerous variations or modifications from the described embodiments may be possible. All U.S. and non-U.S. published patent applications and all U.S. and non-U.S. patents referenced herein are hereby explicitly incorporated herein by reference, irrespective of the page, paragraph, or section in which they are referenced. Where a range of values describes a parameter, all sub-ranges, point values and endpoints within that range are explicitly disclosed herein.

The present disclosure describes systems and methods for finding and marking the longitudinal weld seam of longitudinally welded OCTG or other tubular members or pipe. As mentioned herein, OCTG means any tubular used in the oil & gas industry, except solid tubulars, including but not limited to, drill pipe, line pipe, casing, coiled tubing, and the like, including those that have been through none, all or a combination of any one or more of the common mechanical, thermal, chemical OCTG treatment methods.

The systems of the present disclosure may comprise a single or multiple detectors (sometimes referred to herein as "sensors", "sensor elements", "detector elements") using magnetic flux leakage principles, eddy current, or combinations of these, to find the longitudinal weld of longitudinally welded tubular members. Once found, the detectors send signals to the computer for indicating this position, and the computer subsequently commands the marking assembly to mark the position of the weld seam directly on the pipe. The detector(s) may be mounted a variety of ways depending on the detector being installed, positions available in the apparatus, and the accuracy of longitudinal weld seam detection required. Software either intrinsic to the detector, or installed elsewhere in the apparatus, or installed remotely on a computer type device, converts the measurements into usable calculated information. The usable calculated information may be displayed locally at the device and/or remotely on a computer type device. Digital signal processing software, known under the trade designation Digi-Pro™, available from Scan Systems Corp, Houston, Texas, allows the longitudinal weld seam location signal to be digitized and processed within a computer. The computer and digital signal processing software known under the trade designation Digi-Pro™ may utilize a series of virtual printed circuit boards known under the trade designation SimKardz™ to perform the calculations required. Signals may be captured from the detectors and digitized almost immediately, then processed through one or more algorithms to produce large signal to noise ratios. Improvements in signal to noise ratios of at least 20 percent, sometimes at least 100 percent, and in certain embodiments even 200 percent have been seen, compared with existing industry standard equipment. Hall Element devices may be used to sense the electrical shift in voltage during the weld seam finding portion of methods of the invention; however, there could be any number of different sensing technologies that could be used, eddy current being one of the other preferred sensing technologies.

In certain embodiments, the magnetic field fluctuation detectors may be hall units. Other similar devices may be utilized with the method, selected from magneto resistors, magneto diodes, pickup coils, and combinations of hall units, magneto resistors, magneto diodes, and pickup coils. In certain embodiments, an "or" circuit may be interconnected with each group of magnetic fluctuation detectors so that the largest signal generated from a group of hall units may be determined. In certain embodiments, a defect monitor may be interconnected with each group of the magnetic fluctuation detectors to identify defective hall units or other defective units.

The term "pipe," as used herein, includes any pipe, hose, tube, pole, shaft, cylinder, duct, rod, oil field tubular, tubing for the flow of oil or gas, casing, drill pipe, oil field tubulars and equivalents thereof made in whole or part of a ferromagnetic material.

The term "magnetic field fluctuation detector," used herein, includes hall units, magneto diodes, magneto resistors, and pickup coils. Preferably the magnetic fluctuation detector utilized with embodiments of the present disclosure is a hall unit. The term "hall unit," as used herein, includes any Hall detector, and any device or detector which produces a voltage in relation to a magnetic field applied to the detector. A Hall detector is generally manufactured as a four terminal solid-state device which produces an output voltage proportional to the product of an input current, a magnetic flux density and the sine of the angle between magnetic flux density and the plane of the hall detector. A Hall detector typically has an active element and two pairs of ohmic contacts. An electric current flows between two contacts aligned in one direction x. This current, the magnitude and direction of which are known from a calibration stage, in the presence of a perpendicular magnetic field, generates a respective Hall voltage in the other two contacts aligned in a transverse direction y. As known, a Hall detector is sensitive to that component of the magnetic field which is perpendicular to its surface. More specifically, the Hall voltage is responsive to the current flow and to the strength of a magnetic field provided within the vicinity of the Hall detector.

Figure 2:
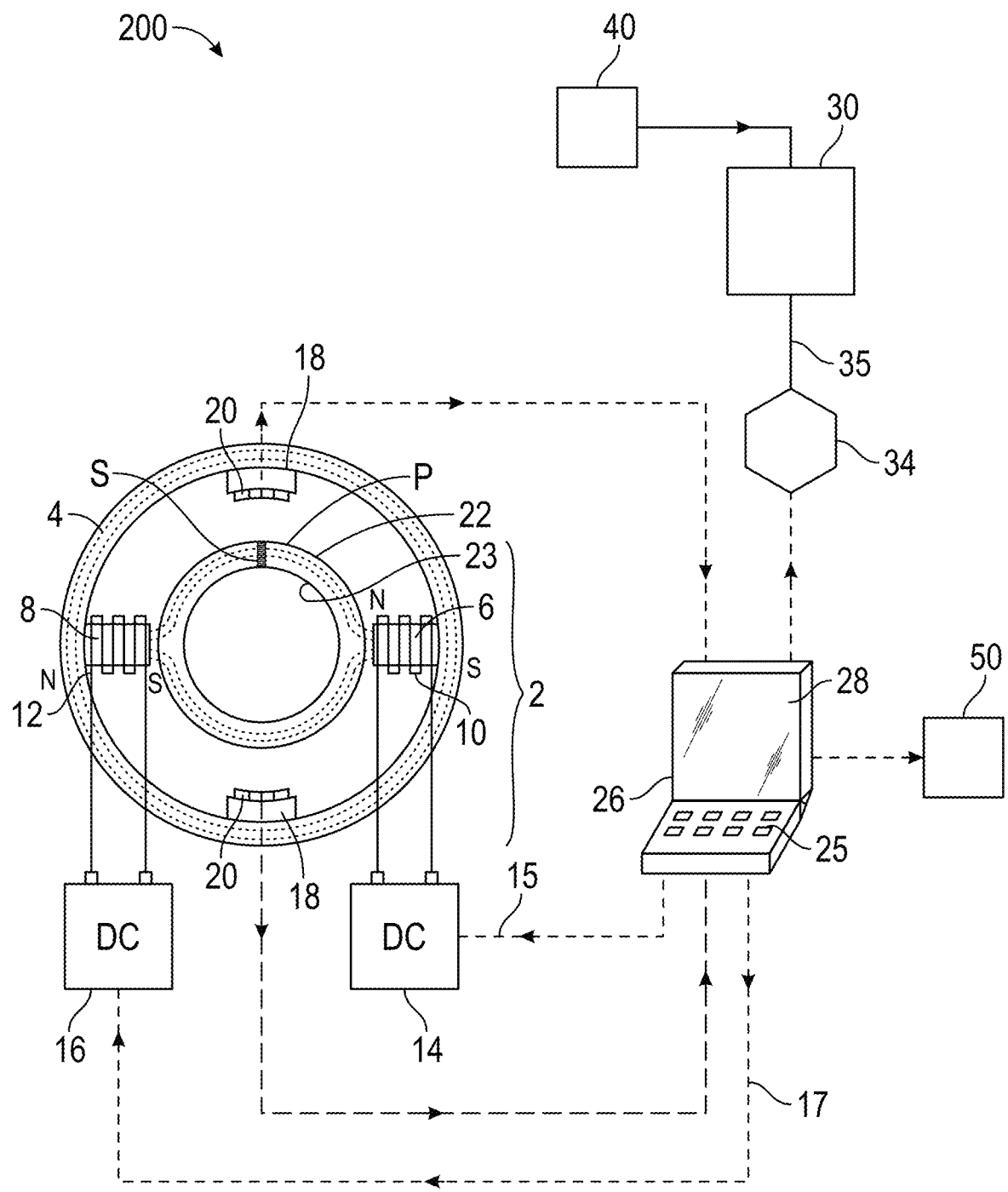
FIG. 2 is a schematic view of another system embodiment of the present disclosure, featuring a portable laptop computer or other portable computer.

The terms "magnetic field generator" and "magnetic coil" as used herein, include any device capable of generating a magnetic field of flux in the tubular, as illustrated schematically in FIG. 2 herein by the dashed lines. Preferably the magnetic field generator is a pair of coils each with multi-turns of wire and each positioned around a magnetic core, with use of a flux return connecting the cores, as further explained herein.

Eddy current inspection, as explained in U.S. Pat. No. 5,142,230, is a non-destructive procedure used to detect flaws and stress corrosion in electrically conductive materials, and as disclosed in WO01001123A1, may be used to detect weld seams in longitudinally welded tubular members. This method involves placing an eddy current probe, comprising a coil, near the electrically conductive material. The coil sets up a magnetic field and induces eddy currents in the material. Defects (or weld seams) in the material alter the eddy current flow and change the impedance of the coil. As a result, longitudinal weld seams may be detected by placing multiple eddy current coils about the circumference of the tubular and detecting changes of impedance of the coils. The one that changes is where the longitudinal weld seam is located.

The primary features of the systems and methods of the present disclosure will now be described with reference to the drawing figures, after which some of the construction and operational details, some of which are optional, will be further explained. The same reference numerals are used throughout to denote the same items in the figures, except where noted. In certain embodiments, the variations in the magnetic field detected by the magnetic flux detectors and/or the variations in eddy current detected by eddy current detectors in the rotating head are provided by spacing the detectors so that their respective magnetic or electric fields abut and provide a minimum of 100 percent inspection of the tubular member, along with adjustments in rpm of the rotating head and linear speed of the LWTM, P.

Referring to the drawing figures, FIG. 1 is a schematic perspective view of one system embodiment 100 of the present disclosure, featuring an operator control cabinet 24, while FIG. 2 is a schematic view of another system embodiment 200 of the present disclosure, featuring a portable laptop computer or other portable computer 26. As illustrated schematically in FIG. 1, a longitudinally welded pipe or tubular member (LWTM) P, includes a longitudinal weld seam, S, that is marked at positions M1, M2, M3 as indicated on the weld seam S. A longitudinal weld seam detection assembly (LWSDA) 2 and a marking assembly 30 are illustrated, as well as a longitudinal axis (LA) of the LWTM P. As explained herein, marks M1, M2, M3 on LWTM P are made by tubular made by marking assembly 30.

Embodiments 100 and 200 are for finding the longitudinal weld seam and marking same for single size tubulars; that is, the marking assemblies of embodiments 100 and 200 are not adjustable for marking tubulars of different diameters. Longitudinal weld seam detector assembly (LWSDA) 2 includes a cylindrical flux return 4, a first magnet core 6, a second magnet core 8, a first coil 10 for first magnet core 6, a second coil 12 for second magnet core 8, all mounted on a rotating head 5, a first DC power source 14 for first coil 10, and a second DC power source 16 for second coil 12. As mentioned previously, first and second DC power sources (14, 16) could be replaced by a single DC power source connected in series or parallel to the first and second coils (10, 12). A further alternative embodiment would be to replace the electromagnets entirely with permanent magnets, since only a small depth of the tubular need be magnetized in order to find the longitudinal weld line; full magnetic saturation of the tubulars is not required. Dashed lines 15 and 17 in FIGS. 1 and 2 denote signals (wired or wireless) from a cabinet 24 with HMI and controls to first and second DC power sources 14, 16, respectively. Sensor supports 18 support one or more magnetic flux or eddy current sensors 20. Outer surface 22 of P and inner surface 23 of P are illustrated.

Cabinet 24 with HMI and controls includes a keyboard 25 and a CRT screen 28 or other human readable device, such as a touch screen. Embodiment 200 differs from embodiment 100 in that a laptop or other portable computer 26 is used rather than a stationary cabinet 24.

Marking assemblies described herein (annulus or iris versions) include one or more markers, marking heads, or nozzles 32. In certain embodiments, a pneumatic actuator 34 with pneumatic tubing 35 may be employed to actuate markers 32. In other embodiments, electronic or hydraulic actuators may be employed. One or more signals 33 (wired or wireless) is transmitted from cabinet 24 or portable computer 26 to actuator 34, and one or more signals 37 are transmitted from cabinet 24 or portable computer 26 to hydraulic, pneumatic, or electronic support 50.

In certain embodiments, marking assembly 30 may be an annulus having an outer surface 36, a generally cylindrical inner wall 38 having an inner surface 44, a marking annulus front face plate 41, and a marking annulus rear face plate 43. Marking assembly 30 may also include an ink or other marking fluid supply container 40. Ink or other marking fluid supply container 40 may be fluidly connected by tubing 42 to one or more marking heads 32.

In certain embodiments a signal 37 may be transmitted (wire or wireless) from computer in cabinet 24 (embodiment 100) or laptop computer 26 (embodiment 200) to support member 50 in order to effect vertical movement of marking assembly 30 to allow marking of LWTM P of different diameters. Support 50 may also be engineered to rotate marking assembly 30+/−90 degrees as needed when the longitudinal weld seam moves from its initial position, either by tubular rotation, by the longitudinal weld seam position changing slightly, or both.

Figure 3:
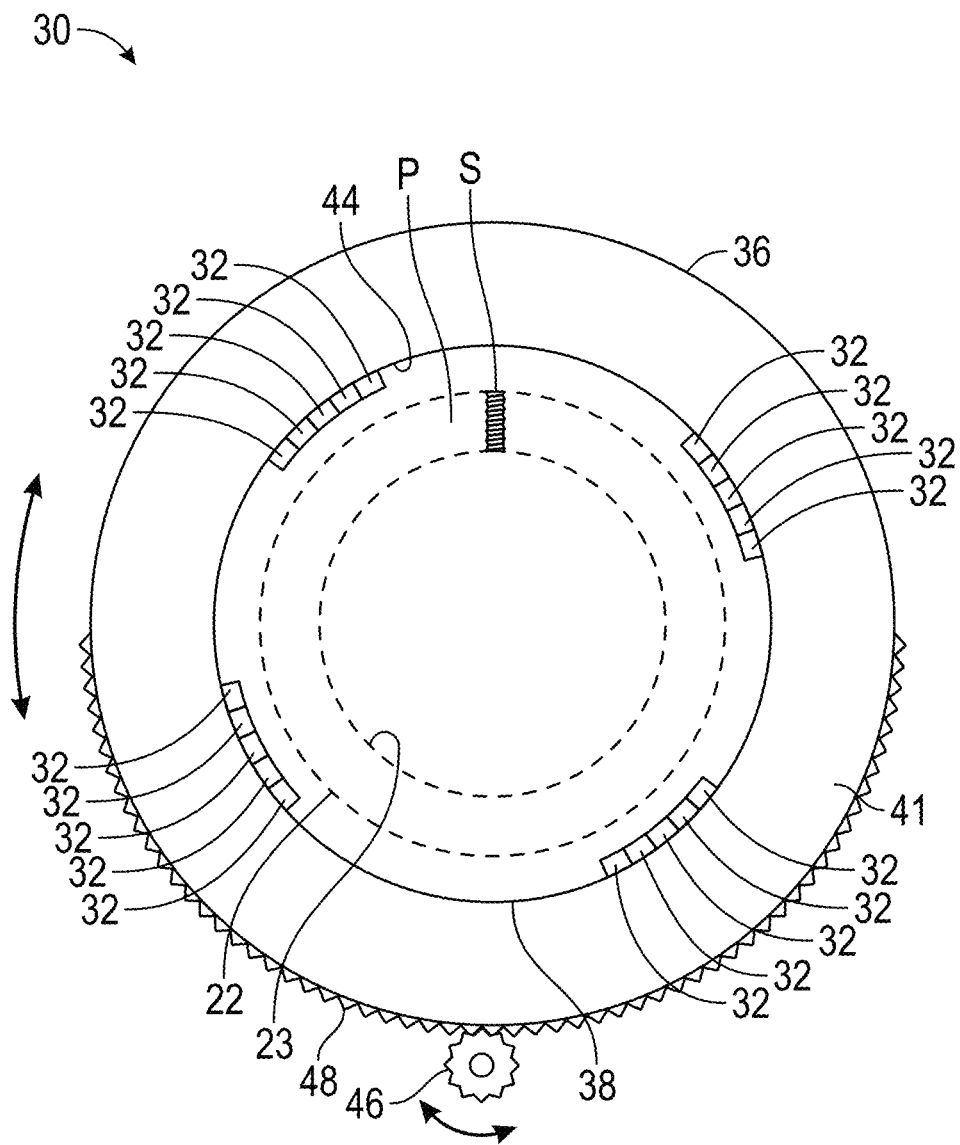
FIG. 3 is a schematic end elevation view of one embodiment of a marking assembly useful in certain system embodiments of the present disclosure.

Referring to FIG. 3, a geared drive wheel 46 may be employed in certain embodiments to mate with mating gears 48 on periphery of outer surface 36 of marking assembly 30 and provide the rotational movement of marking assembly 30, for example when the sensors 20 sense that the longitudinal weld seam has changed position in the LWTM P.

FIGS. 4, 5, 6, 7, 8, and 9 are various views of another marking assembly embodiment 260 useful in systems of the present disclosure, featuring an adjustable iris plate rotor 104, which is adjustable to accommodate different diameter tubulars. Embodiment 260 comprises:

(i) an adjustable iris rotor plate 104 having a central passage 105 and one or more arcuate slots 110;
(ii) a drive plate 106 also having a central passage substantially coincident with central passage 105, drive plate 106 comprising one or more U-shaped support brackets 120 configured to support and guide adjustable iris rotor plate 104 when the adjustable iris rotor plate (104) is moved to accommodate different diameter LWTM, P; and (iii) a center stator plate 108 also having a central passage substantially coincident with central passage 105, center stator plate 108 comprising one or more marking heads 116 slidably secured thereto by respective rails 138.

In embodiment 260, adjustable iris rotor plate 104 further comprises two or more through holes 112 near a peripheral outer edge 118 of adjustable iris rotor plate 104, and an adjustment pin 114 that may be moved into and out of two or more through holes 112, each of the two or more through holes 112 corresponding to respective two or more diameters of LWTM (P) to be marked. A handle 117 allows manual movement of the iris rotor plate 104 to position one of the marking heads 116 adjacent where the longitudinal weld seam is initially.

Center stator plate 108 comprises one or more marking heads 116 slidably secured thereto by respective rails 138 and further comprises rollers positioned in one or more arcuate slots 110. A set of spacer rollers 124 is mounted on an inner edge of center stator plate 108. Embodiment 260 further includes a set of gear teeth 126 on an outer edge of drive plate 106, and a gear drive wheel 128 having teeth mating with the set of gear teeth 126. When the sensors in the LWSDA detect an initial location of the longitudinal weld seam (S), a signal or signals are sent to the computer, which then sends a command signal to a servo motor operating the geared drive wheel 128 to rotate the entire marking assembly 260 clockwise or counterclockwise so that one of the marking heads 116 is located adjacent the longitudinal weld seam in marking position, and is able to change in position within +/−90 degrees as the longitudinal weld seam (S) position changes. A set of marking head supports 130 supporting the one or more marking heads 116, each one of the marking head supports 130 mounted on one of the respective rails 138. Each of the one or more marking heads 116 comprises an instrument air inlet port 132 and an instrument air exhaust port 134 in this embodiment; however, other embodiments may employ hydraulic or electronic actuators for marking heads 116.

Figure 4:
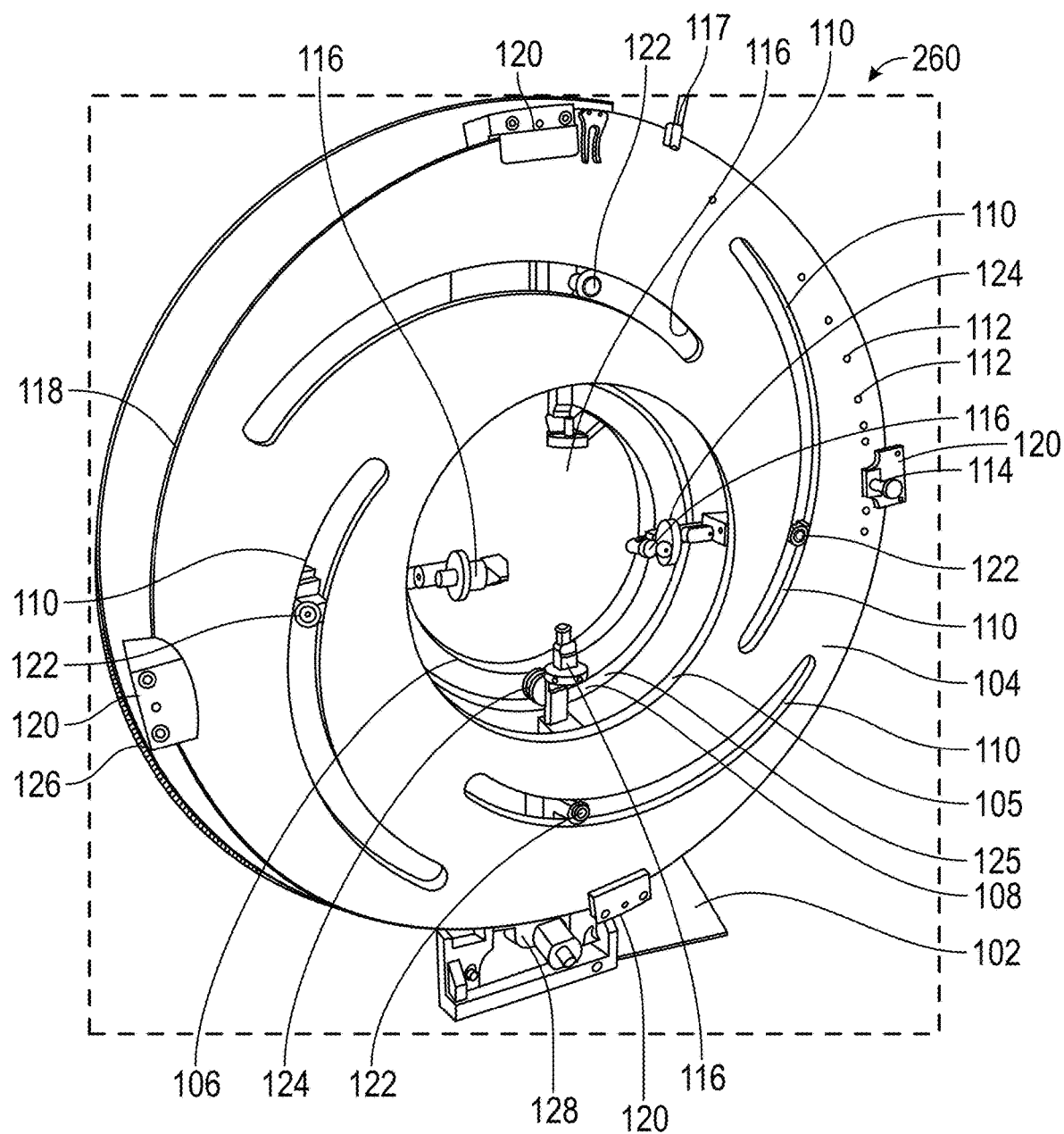
FIGS. 4, 5, 6, 7, 8, and 9 are various views of another marking assembly useful in systems of the present disclosure, featuring an adjustable iris plate rotor.
Figure 5:
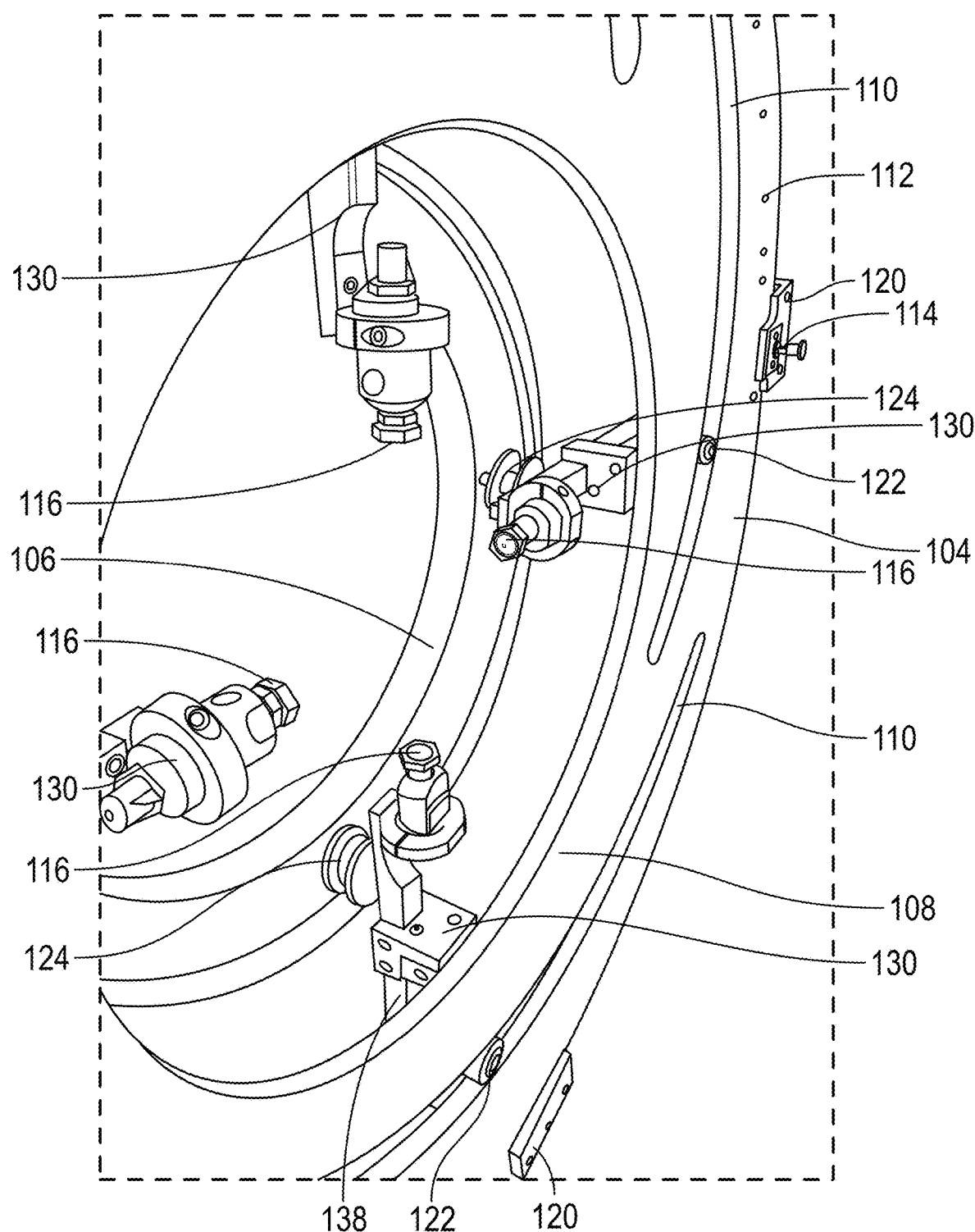
Figure 6:
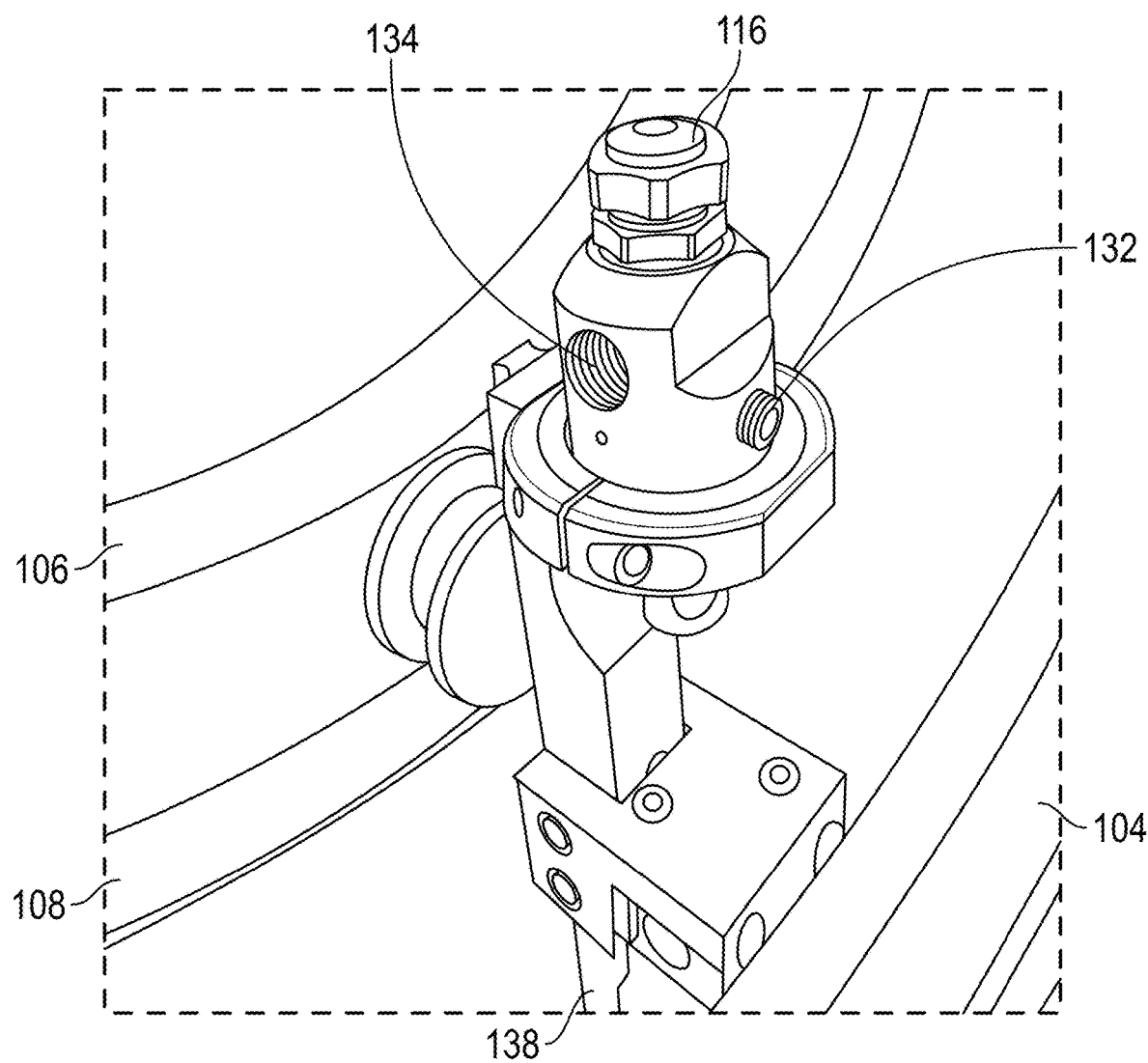
Figure 7:
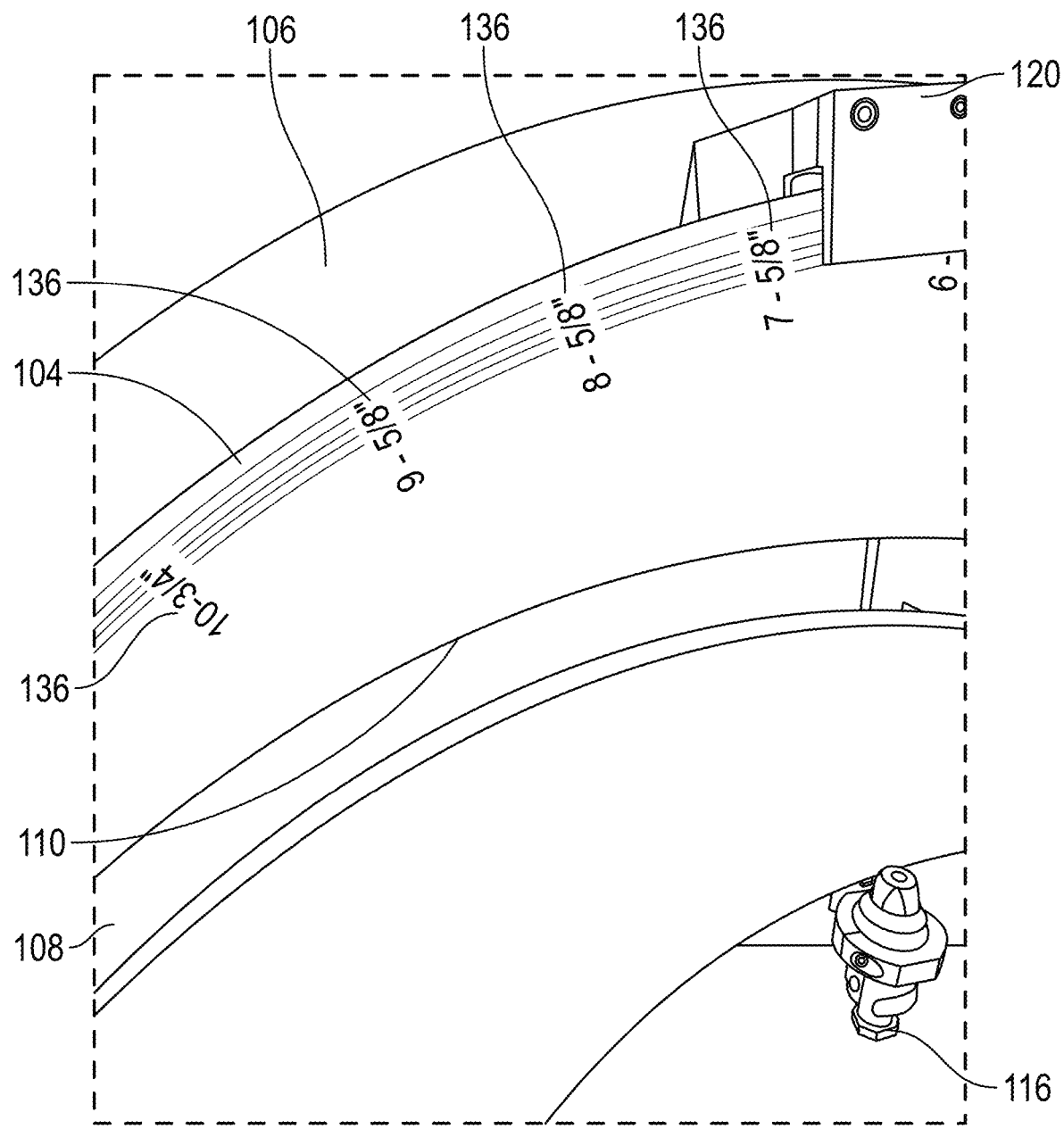
Figure 8:
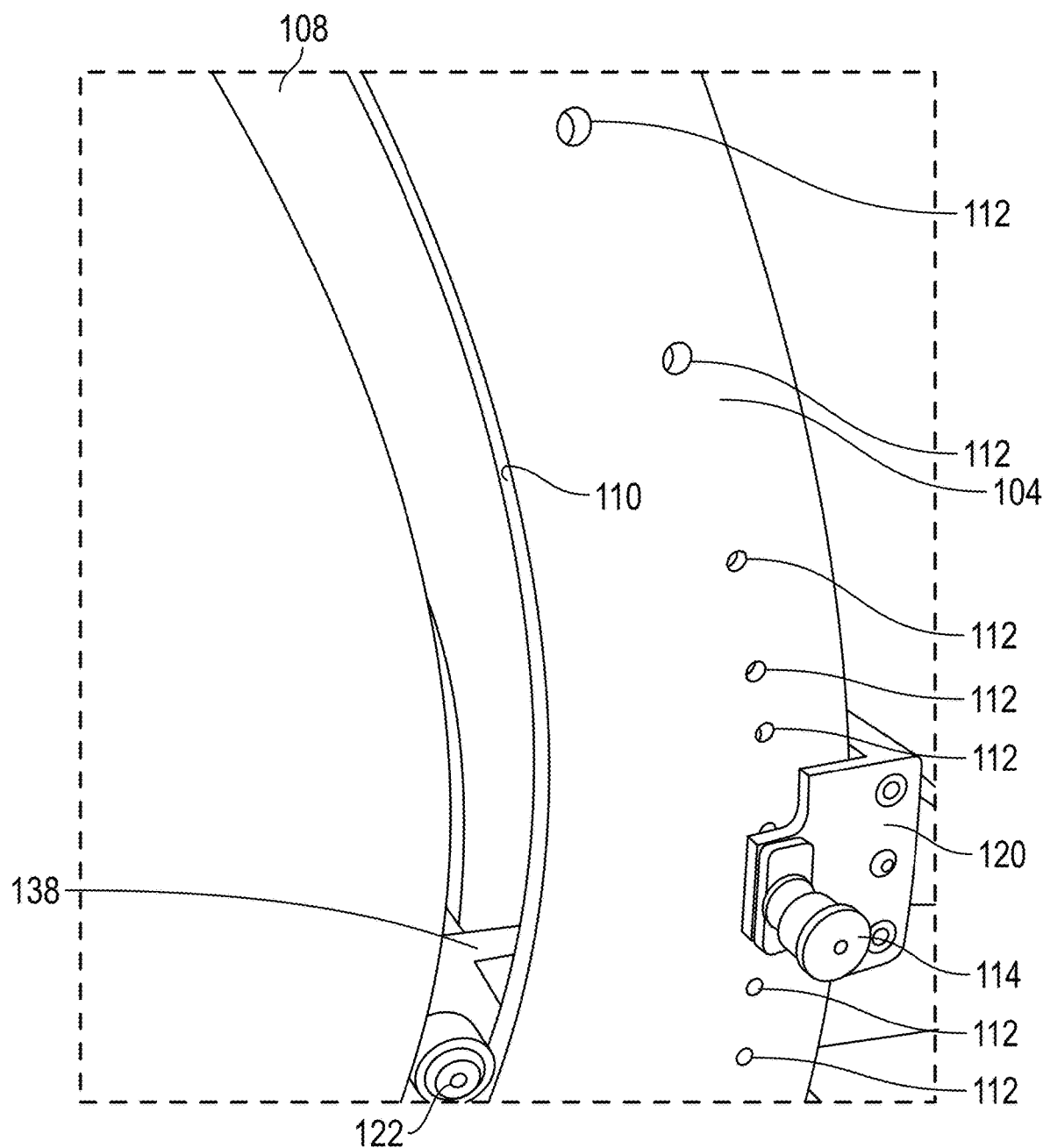
Figure 9:
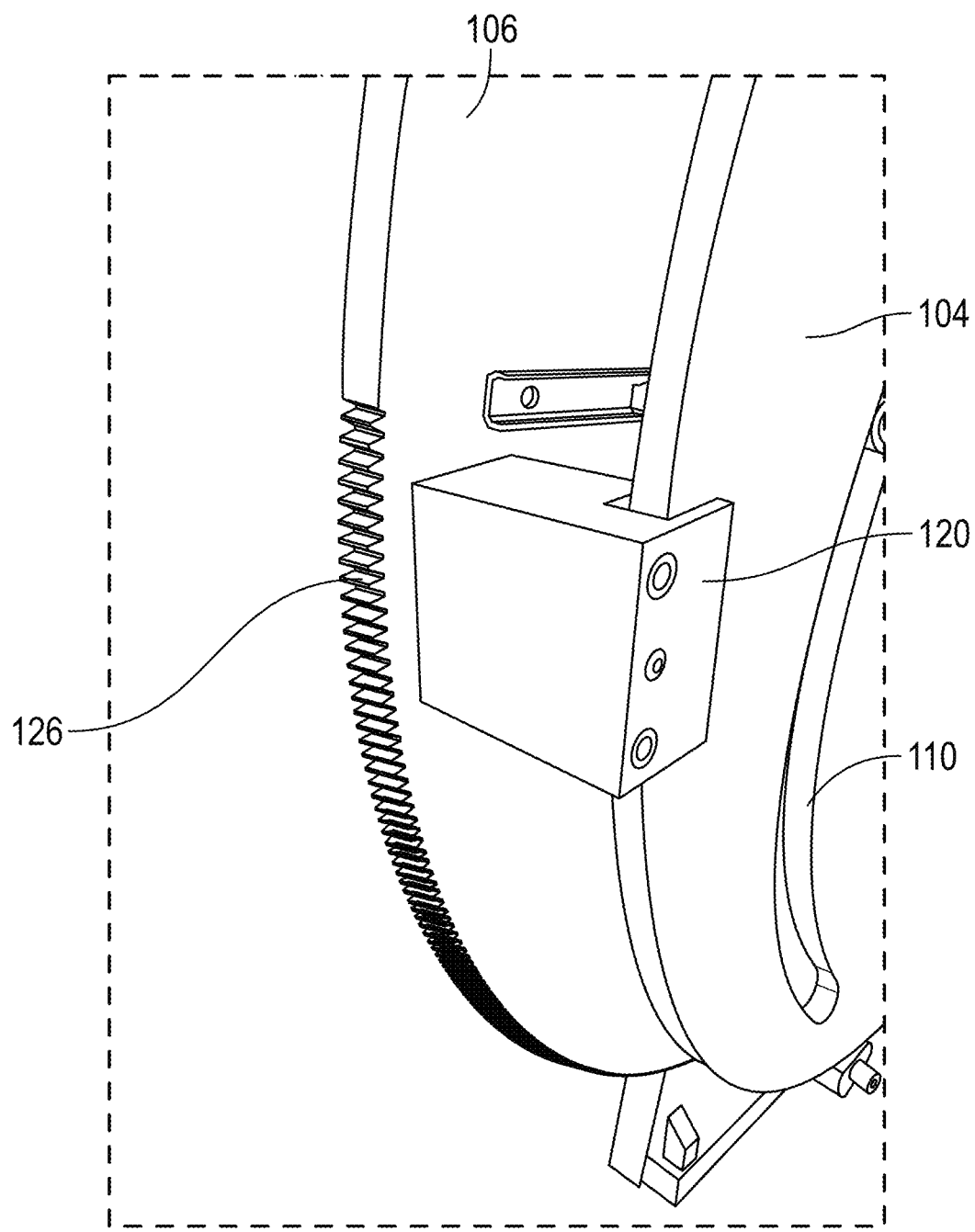

As illustrated best in FIGS. 4 and 5, in embodiment 260 the one or more marking heads 116 comprises first, second, third, and fourth marking heads positioned at 0, 90, 180, and 270 degrees around a circumference of the adjustable iris rotor plate 104. This allows embodiments wherein the marking of the longitudinal weld seam S may comprise the computer instructing one of the first, second, third, or fourth marking heads to mark the longitudinal weld seam S according to which of the first, second, third, or fourth marking heads is closest to the weld seam S, and/or to rotate the marking assembly 260 to positioned the detected longitudinal weld seam S to be under the nearest marking or printing head or nozzle 116.

In certain embodiments, the LWSDA 2 and the marking assembly (30 or 260) may be separated by a longitudinal distance d (FIG. 1), where d ranges from about 5 feet or less to about 20 feet or more. The distance d can be any value. The lower value of d is limited only by the ability of the computer and actuators to rotate the marking assembly (30, 116) if necessary and mark the LWTM P. The upper value of d is limited only by the length of LWTM P being marked, or the length of the building inside of which marking is occurring; otherwise, there is no real upper limit to the distance d.

Embodiment 260 further comprises two or more stamped or embossed markings near the peripheral edge 118 of adjustable iris rotor plate 104 indicating LWTM (P) diameters.

As in other embodiments, marking assembly 260 may include a hydraulic, pneumatic, or electronically-operated frame 102 allowing vertical movement.

Embodiment 260 includes support brackets 120 (U-shaped) secured to stator plate 108 by bracket screws 121. Support brackets 120 each include internal rollers (not illustrated) that secure and guide the iris rotor plate 104. An operator manually selects and sets OD of the LWTM P to be marked using handle 117 and adjustment pin 114. A set of first rollers 122 traverse arcuate slots 110, and a second set of second rollers 124 (spacers) traverse inner edge 125 of stator 108. A set of gear teeth 126 on periphery of drive plate 106 mate with teeth of a gear drive 128, as noted above. Marking heads 116 are supported by supports 130, and an instrument air input 132 and an instrument air exhaust 134 are provided in this embodiment for each of the four marking heads 116. Size settings 136 are etched or stamped onto periphery of rotor 104, and a set of rails 138 allow radial movement of marking or printing heads or nozzles 116.

Figure 10:
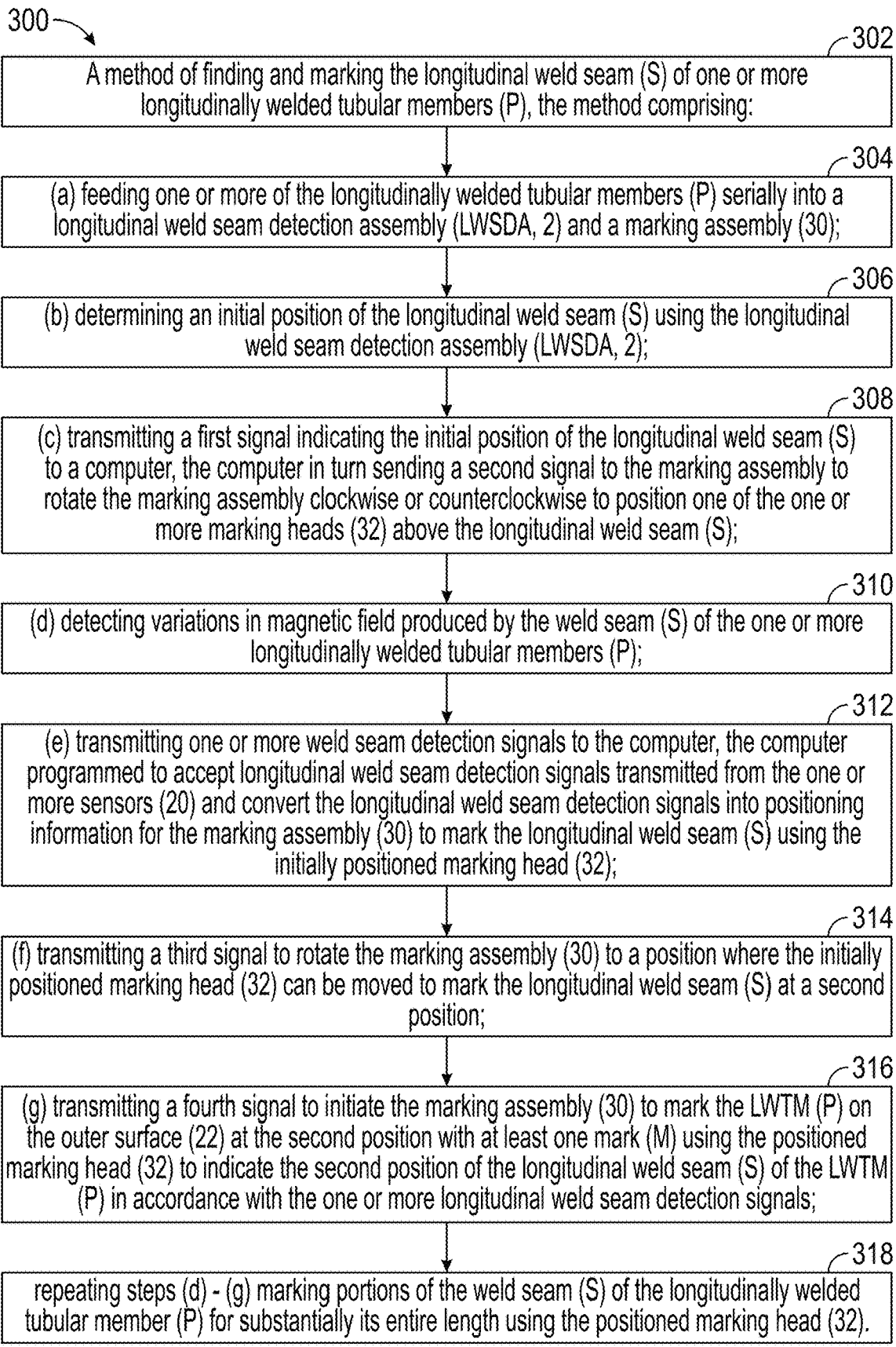
FIGS. 10 and 11 are logic diagrams of two methods of finding and marking the longitudinal weld seam of longitudinally welded tubular members or other OCTG in accordance with the present disclosure.
Figure 11:
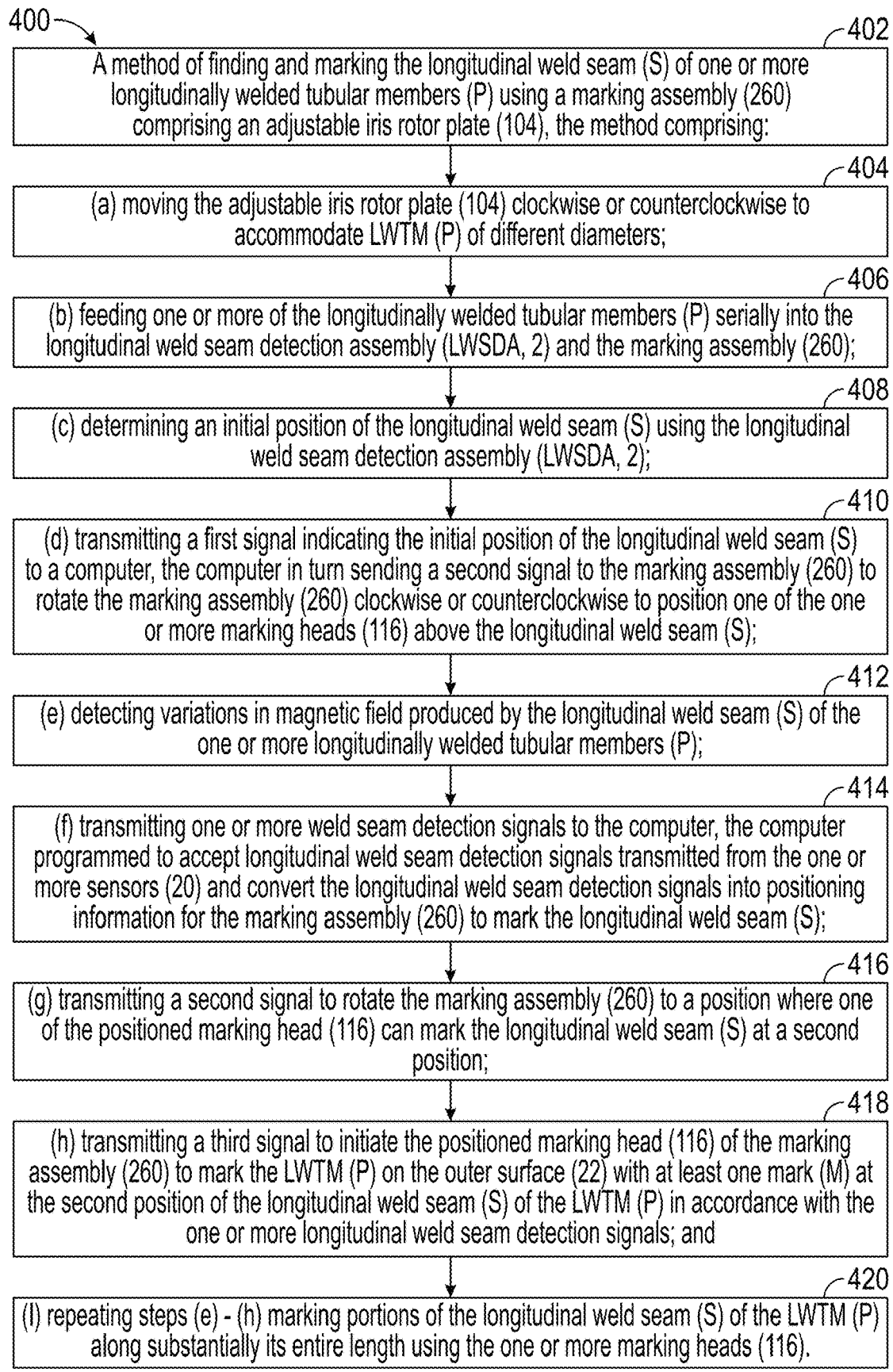

FIGS. 10 and 11 are logic diagrams of two method embodiments 300 and 400 of finding and marking the longitudinal weld seam S of longitudinally welded tubular members P, pipe or other OCTG in accordance with the present disclosure. Method embodiment 300 of finding and marking the longitudinal weld seam of longitudinally welded tubular members comprises (box 302):

(a) feeding one or more of the longitudinally welded tubular members (P) serially into a longitudinal weld seam detection assembly (LWSDA, 2) and a marking assembly (30) (box 304);

(b) determining an initial position of the longitudinal weld seam (S) using the longitudinal weld seam detection assembly (LWSDA, 2) (box 306);

(c) transmitting a first signal indicating the initial position of the longitudinal weld seam (S) to a computer, the computer in turn sending a second signal to the marking assembly to rotate the marking assembly clockwise or counterclockwise to position one of the one or more marking heads (32) above the longitudinal weld seam (S) (box 308);

(d) detecting variations in magnetic field produced by the weld seam (S) of the one or more longitudinally welded tubular members (P) (box 310);

(e) transmitting one or more weld seam detection signals to the computer, the computer programmed to accept longitudinal weld seam detection signals transmitted from the one or more sensors (20) and convert the longitudinal weld seam detection signals into positioning information for the marking assembly (30) to mark the longitudinal weld seam (S) using the initially positioned marking head (32) (box 312);

(f) transmitting a third signal to rotate the marking assembly (30) to a position where the initially positioned marking head (32) can be moved to mark the longitudinal weld seam (S) at a second position (box 314);

(g) transmitting a fourth signal to initiate the marking assembly (30) to mark the LWTM (P) on the outer surface (22) at the second position with at least one mark (M) using the positioned marking head (32) to indicate the second position of the longitudinal weld seam (S) of the LWTM (P) in accordance with the one or more longitudinal weld seam detection signals (box 316); and (h) repeating steps (d)-(g) marking portions of the weld seam (S) of the longitudinally welded tubular member (P) for substantially its entire length using the positioned marking head (32) (box 318).

Method embodiment 400 of finding and marking the longitudinal weld seam of longitudinally welded tubular members comprises (box 402):

(a) moving the adjustable iris rotor plate (104) clockwise or counterclockwise to accommodate LWTM (P) of different diameters (box 404);

(b) feeding one or more of the longitudinally welded tubular members (P) serially into the longitudinal weld seam detection assembly (LWSDA, 2) and the marking assembly (260) (box 406);

(c) determining an initial position of the longitudinal weld seam (S) using the longitudinal weld seam detection assembly (LWSDA, 2) (box 408);

(d) transmitting a first signal indicating the initial position of the longitudinal weld seam (S) to a computer, the computer in turn sending a second signal to the marking assembly (260) to rotate the marking assembly (260) clockwise or counterclockwise to position one of the one or more marking heads (116) above the longitudinal weld seam (S) (box 410);

(e) detecting variations in magnetic field produced by the longitudinal weld seam (S) of the one or more longitudinally welded tubular members (P) (box 412);

(f) transmitting one or more weld seam detection signals to the computer, the computer programmed to accept longitudinal weld seam detection signals transmitted from the one or more sensors (20) and convert the longitudinal weld seam detection signals into positioning information for the marking assembly (260) to mark the longitudinal weld seam (S) (box 414);

(g) transmitting a second signal to rotate the marking assembly (260) to a position where one of the positioned marking head (116) can mark the longitudinal weld seam (S) at a second position (box 416);

(h) transmitting a third signal to initiate the positioned marking head (116) of the marking assembly (260) to mark the LWTM (P) on the outer surface (22) with at least one mark (M) at the second position of the longitudinal weld seam (S) of the LWTM (P) in accordance with the one or more longitudinal weld seam detection signals (box 418); and (i) repeating steps (e)-(h) marking portions of the longitudinal weld seam (S) of the LWTM (P) along substantially its entire length using the one or more marking heads (116) (box 420).

An on-board power unit may be included in certain system embodiments for powering the magnetic flux generator(s) (coils 10, 12) in embodiments using electromagnets. The power unit may be a permanent or rechargeable battery pack or transformer for electrical power, or both. An on-board electronics package may include one or more microprocessors, programmable logic controllers (PLCs), a communications link (wired or wireless), and/or an on-board controller. A CRT, LED or other human-machine interface may be included.

Magnetic flux generator(s) and/or eddy current generators, detectors, marking heads or nozzles 32, 116, and sensors 20 may, in certain embodiments, be powered from within via an instrument display or other human/machine interface (HMI), for example using batteries, Li-ion or other type. In other embodiments display/HMI may be powered from an instrument cable providing power, perhaps by a local generator, or grid power. The display/HMI on allows an operator to interface with the instrument. In certain embodiments the operator will be able to take measurements, view or read these measurements and reset the instrument for subsequent measurement taking.

In summary, what has not been recognized or realized are apparatus, systems, and methods to accurately and repeatably find and mark longitudinal weld seams in longitudinally welded tubular members, especially with a combination of magnetic flux detectors and eddy current detectors, or only with magnetic flux detectors, with marking assemblies described herein. Apparatus, systems, and methods to accomplish this quickly to increase pipe production without significant risk to workers is highly desirable.

It will be apparent that in other embodiments, the various components (such as cabinets, slots, pipe supports, marking heads, marking head supports, and the like) need not have the shapes illustrated in the various drawing figures, but rather could take any shape, such as a box or cube shape, elliptical, triangular, pyramidal (for example, three or four sided), prism-shaped, hemispherical or semi-hemispherical-shaped (dome-shaped), or combination thereof and the like, as long as the longitudinal weld seam of the longitudinally welded tubular members are found and marked as described herein. It will be understood that such embodiments are part of this disclosure and deemed with in the claims. Furthermore, one or more of the various components may be ornamented with various ornamentation produced in various ways (for example stamping or engraving, or raised features such as reflectors, reflective tape, and the like), logos, letters, words, nicknames (for example BIG JAKE, and the like). Hand holds may be machined or formed to have easy-to-grasp features for fingers or may have rubber grips shaped and adorned with ornamental features, such as raised knobby gripper patterns.

Thus the apparatus, systems, and methods described herein provide a quick and safe way of finding and marking the longitudinal weld seam of longitudinally welded tubular members accurately and repeatably.

From the foregoing detailed description of specific embodiments, it should be apparent that patentable apparatus, systems, and methods have been described. Although specific embodiments of the disclosure have been described herein in some detail, this has been done solely for the purposes of describing various features and aspects of the apparatus, systems, and methods, and is not intended to be limiting with respect to their scope. It is contemplated that various substitutions, alterations, and/or modifications, including but not limited to those implementation variations which may have been suggested herein, may be made to the described embodiments without departing from the scope of the appended claims. Such embodiments are considered with the present disclosure and claims.

What is claimed is:

1. A longitudinal weld seam finding and marking system for longitudinally welded tubular members (P) comprising:

(a) a longitudinal weld seam detection assembly (LWSDA, 2) and a marking assembly (30) configured to be positioned about a longitudinally welded tubular member (LWTM, P) in an inspection position, the LWSDA (2) comprising a head (5) configured to be rotated about the LWTM, the head (5) configured to be rotated supporting a magnetic flux generator including a flux return (4), and supporting one or more sensors (20) supported by the flux return (4) and sensor supports (18), the marking assembly (30) comprising one or more marking heads (32);

(b) the LWSDA (2) and the marking assembly (30) each having an inlet opening and an outlet opening for passing the LWTM (P) therethrough, the one or more sensors (20) comprising one or more magnetic or eddy current detectors adapted to be spaced a distance (D) from an outer surface (22) of the LWTM (P) during an inspection;

(c) a computer programmed to
  (i) accept longitudinal weld seam detection signals transmitted from the one or more sensors (20) and convert the longitudinal weld seam detection signals into positioning information for the marking assembly (30) to mark the longitudinal weld seam (S);
  (ii) transmit a first signal to rotate the marking assembly (30) to a position where one of the one or more marking heads (32) can mark the longitudinal weld seam (S);
  (iii) transmit a second signal to initiate the marking assembly (30);

(d) the marking assembly (30) configured to mark the LWTM (P) on the outer surface (22) with at least one mark (M) using the one of the one or more marking heads (32) to indicate a location of the longitudinal weld seam (S) of the LWTM (P) in accordance with the longitudinal weld seam detection signals;

the marking assembly is configured to be non-adjustable for diameter of the LWTM (P) during an inspection of the LWTM (P); and the LWSDA comprises a flux return (4) bridging a first magnet core (6) and a second magnet core (8), a first electrically conductive coil (10) wrapped around the first magnet core (6), a second electrically conductive coil (12) wrapped around the second magnet core (8), a first DC power source (14) for the first electrically conductive coil (10), and a second DC power source (16) for the second electrically conductive coil (12).

2. The system of claim 1, wherein the first and second DC power sources (14, 16) are configured to accept respective signals (15, 17) from a cabinet (24) with a human-machine interface and computer controls or a laptop computer (26) or other portable computer, the human-machine interface or the laptop computer (26) or other portable computer having a keyboard (25) and CRT screen (28).

3. The system of claim 2, wherein the cabinet (24) with the human-machine interface and the computer controls or a laptop computer (26) or other portable computer are configured to send signals (33) to an actuator (34) to actuate the one or more marking heads (32).

4. The system of claim 2, wherein the cabinet (24) with the human-machine interface and the computer controls or a laptop computer (26) or other portable computer are configured to send signals (37) to a support stand (50) configured to move the marking assembly (30) vertically up or down as needed depending on the diameter of the LWTM (P) to be marked, wherein the support stand is selected from hydraulic, pneumatic, and electric support stands.

5. The system of claim 1, further comprising an ink or other marking fluid supply container (40) fluidly connected by tubing (42) to the one or more marking heads (32).

6. The system of claim 2, further comprising a geared drive wheel (46) having gear teeth that mate with gear teeth on an outer surface (36) of the marking assembly (30), allowing the marking assembly (30) to rotate as commanded by the cabinet (24) with the human-machine interface and the computer controls or the laptop computer (26) or other portable computer.

7. A method of finding and marking the longitudinal weld seam (S) of one or more longitudinally welded tubular members (P), the method comprising:

(a) feeding one or more of the longitudinally welded tubular members (P) serially into a longitudinal weld seam detection assembly (LWSDA, 2) and a marking assembly (30), the marking assembly being non-adjustable for diameter of the LWTM (P) during inspection, and the LWSDA comprises a flux return (4) bridging a first magnet core (6) and a second magnet core (8), a first electrically conductive coil (10) wrapped around the first magnet core (6), a second electrically conductive coil (12) wrapped around the second magnet core (8), a first DC power source (14) for the first electrically conductive coil (10), and a second DC power source (16) for the second electrically conductive coil (12);

(b) determining an initial position of the longitudinal weld seam (S) using the longitudinal weld seam detection assembly (LWSDA, 2);

(c) transmitting a first signal indicating the initial position of the longitudinal weld seam (S) to a computer, the computer in turn sending a second signal to the marking assembly to rotate the marking assembly clockwise or counterclockwise to position one of the one or more marking heads (32) above the longitudinal weld seam (S);

(d) detecting variations in magnetic field produced by the weld seam (S) of the one or more longitudinally welded tubular members (P);

(e) transmitting one or more weld seam detection signals to the computer, the computer programmed to accept longitudinal weld seam detection signals transmitted from the one or more sensors (20) and convert the longitudinal weld seam detection signals into positioning information for the marking assembly (30) to mark the longitudinal weld seam (S) using the initially positioned marking head (32);

(f) transmitting a third signal to rotate the marking assembly (30) to a position where the initially positioned marking head (32) can be moved to mark the longitudinal weld seam (S) at a second position;

(g) transmitting a fourth signal to initiate the marking assembly (30) to mark the LWTM (P) on the outer surface (22) at the second position with at least one mark (M) using the positioned marking head (32) to indicate the second position of the longitudinal weld seam (S) of the LWTM (P) in accordance with the one or more longitudinal weld seam detection signals; and (h) repeating steps (d)-(g) marking portions of the weld seam (S) of the longitudinally welded tubular member (P) for substantially its entire length using the positioned marking head (32).

8. The method of claim 7, wherein the marking of the longitudinal weld seam (S) occurs periodically so that the longitudinal weld seam (S) is marked by a plurality of separate marks, where a length between marks ranges from about 1 inch to about 20 inches.

9. The method of claim 7, wherein the longitudinal weld seam (S) is marked with a marking fluid selected from ink and paint by the positioned marking head (32).

10. The method of claim 7, wherein the one or more marking heads (32) comprises first, second, third, and fourth marking heads positioned at 0, 90, 180, and 270 degrees around a circumference of the longitudinally welded tubular member (P), and the marking of the longitudinal weld seam (S) comprises the computer instructing one of the first, second, third, or fourth marking heads to mark the longitudinal weld seam (S) according to which of the first, second, third, or fourth marking heads is closest to the weld seam (S).

11. The method of claim 7, wherein the (LWSDA, 2) and the marking assembly (30) are separated by a longitudinal distance d, where d ranges from about 5 to about 20 feet.

12. The method of claim 7, further comprising adjusting position of one or more downstream ultrasonic transducers based on the marked portions after step (f).

13. The method of claim 7, further comprising the one or more sensors (20) continuously tracking the position of the longitudinal weld seam (S) and storing the longitudinal weld seam position as stored data for the entire length of the LWTM (P).

14. A longitudinal weld seam finding and marking system for longitudinally welded tubular members (P) comprising:
  (a) a longitudinal weld seam detection assembly (LWSDA, 2) and a marking assembly (30) configured to be positioned about a longitudinally welded tubular member (LWTM, P) in an inspection position, the LWSDA (2) comprising a head (5) configured to be rotated about the LWTM, the head (5) configured to be rotated supporting a magnetic flux generator including a flux return (4), and supporting one or more sensors (20) supported by the flux return (4) and sensor supports (18), the marking assembly (30) comprising one or more marking heads (32);
  (b) the LWSDA (2) and the marking assembly (30) each having an inlet opening and an outlet opening for passing the LWTM (P) therethrough, the one or more sensors (20) comprising one or more magnetic or eddy current detectors adapted to be spaced a distance (D) from an outer surface (22) of the LWTM (P) during an inspection;
  (c) a computer programmed to
    (i) accept longitudinal weld seam detection signals transmitted from the one or more sensors (20) and convert the longitudinal weld seam detection signals into positioning information for the marking assembly (30) to mark the longitudinal weld seam (S);
    (ii) transmit a first signal to rotate the marking assembly (30) to a position where one of the one or more marking heads (32) can mark the longitudinal weld seam (S);
    (iii) transmit a second signal to initiate the marking assembly (30);
  (d) the marking assembly (30) configured to mark the LWTM (P) on the outer surface (22) with at least one mark (M) using the one of the one or more marking heads (32) to indicate a location of the longitudinal weld seam (S) of the LWTM (P) in accordance with the longitudinal weld seam detection signals;
  the marking assembly is non-adjustable for diameter of the LWTM (P) during inspection; and
  the LWSDA comprises a flux return (4) bridging a first permanent magnet and a second permanent magnet.

15. A method of finding and marking the longitudinal weld seam (S) of one or more longitudinally welded tubular members (P), the method comprising:
  (a) feeding one or more of the longitudinally welded tubular members (P) serially into a longitudinal weld seam detection assembly (LWSDA, 2) and a marking assembly (30), the marking assembly being non-adjustable for diameter of the LWTM (P) during inspection, and the LWSDA comprises a flux return (4) bridging a first permanent magnet and a second permanent magnet;
  (b) determining an initial position of the longitudinal weld seam (S) using the longitudinal weld seam detection assembly (LWSDA, 2);
  (c) transmitting a first signal indicating the initial position of the longitudinal weld seam (S) to a computer, the computer in turn sending a second signal to the marking assembly to rotate the marking assembly clockwise or counterclockwise to position one of the one or more marking heads (32) above the longitudinal weld seam (S);
  (d) detecting variations in magnetic field produced by the weld seam (S) of the one or more longitudinally welded tubular members (P);
  (e) transmitting one or more weld seam detection signals to the computer, the computer programmed to accept longitudinal weld seam detection signals transmitted from the one or more sensors (20) and convert the longitudinal weld seam detection signals into positioning information for the marking assembly (30) to mark the longitudinal weld seam (S) using the initially positioned marking head (32);
  (f) transmitting a third signal to rotate the marking assembly (30) to a position where the initially positioned marking head (32) can be moved to mark the longitudinal weld seam (S) at a second position;
  (g) transmitting a fourth signal to initiate the marking assembly (30) to mark the LWTM (P) on the outer surface (22) at the second position with at least one mark (M) using the positioned marking head (32) to indicate the second position of the longitudinal weld seam (S) of the LWTM (P) in accordance with the one or more longitudinal weld seam detection signals; and
  (h) repeating steps (d)-(g) marking portions of the weld seam (S) of the longitudinally welded tubular member (P) for substantially its entire length using the positioned marking head (32).

* * * * *